(12) United States Patent
Archer et al.

(10) Patent No.: US 7,161,316 B2
(45) Date of Patent: Jan. 9, 2007

(54) METHOD AND APPARATUS FOR DISCRETE SPEED COMPENSATED TORQUE STEP MOTOR CONTROL

(75) Inventors: William R. Archer, Fort Wayne, IN (US); Brian L. Beifus, Fort Wayne, IN (US); Kamron M. Wright, Fort Wayne, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/979,494

(22) Filed: Nov. 2, 2004

(65) Prior Publication Data

US 2006/0091839 A1 May 4, 2006

(51) Int. Cl.
*H02P 7/00* (2006.01)
(52) U.S. Cl. .................................. 318/432; 318/432
(58) Field of Classification Search ................ 318/432
See application file for complete search history.

(56) References Cited

U.S. PATENT DOCUMENTS

| 3,548,280 | A | * | 12/1970 | Cockroft | 318/443 |
|---|---|---|---|---|---|
| 3,684,170 | A | * | 8/1972 | Roof | 236/38 |
| 3,887,854 | A | * | 6/1975 | Parks | 318/775 |
| 3,932,729 | A | * | 1/1976 | Schlangen | 219/486 |
| 3,934,471 | A | * | 1/1976 | White et al. | 73/861.04 |
| 3,962,615 | A | * | 6/1976 | Spangler | 388/838 |
| 4,005,347 | A | * | 1/1977 | Erdman | 318/254 |
| 4,011,735 | A | * | 3/1977 | Martz et al. | 62/186 |
| 4,169,990 | A | * | 10/1979 | Lerdman | 318/138 |
| 4,495,485 | A | * | 1/1985 | Smith | 341/33 |
| 4,515,538 | A | * | 5/1985 | Shih | 417/572 |
| 4,607,789 | A | * | 8/1986 | Bowman | 236/49.3 |
| 4,638,233 | A | * | 1/1987 | Erdman | 318/644 |
| 4,806,833 | A | * | 2/1989 | Young | 318/254 |
| 4,860,231 | A | * | 8/1989 | Ballard et al. | 702/47 |
| 4,978,896 | A | * | 12/1990 | Shah | 318/254 |
| 5,019,757 | A | * | 5/1991 | Beifus | 318/254 |
| 5,043,642 | A | * | 8/1991 | Ohi | 318/254 |
| 5,075,608 | A | * | 12/1991 | Erdman et al. | 318/599 |
| 5,192,887 | A | * | 3/1993 | Theis | 310/68 C |
| 5,241,253 | A | * | 8/1993 | Schlangen | 318/779 |
| 5,265,305 | A | * | 11/1993 | Kraft et al. | 15/319 |
| 5,381,584 | A | * | 1/1995 | Jyoraku et al. | 15/319 |
| 5,394,694 | A | * | 3/1995 | Doumov et al. | 60/363 |
| 5,410,230 | A | * | 4/1995 | Bessler et al. | 318/471 |
| 5,418,438 | A | * | 5/1995 | Hollenbeck | 318/432 |
| 5,447,414 | A | * | 9/1995 | Nordby et al. | 417/20 |
| 5,517,418 | A | * | 5/1996 | Green et al. | 701/13 |
| 5,557,182 | A | * | 9/1996 | Hollenbeck et al. | 318/432 |

(Continued)

OTHER PUBLICATIONS

"Design for Signal Integrity," website http://www.ami.ac.uk/courses/ami4822_dsi/u02/index.asp, pp. 1-17.*

(Continued)

*Primary Examiner*—Lincoln Donovan
*Assistant Examiner*—Robert W. Horn
(74) *Attorney, Agent, or Firm*—Armstrong Teasdale LLP

(57) ABSTRACT

Methods and apparatus for controlling a motor are provided. The motor may be operated in a fluid system having a variable static pressure acting on the motor. The method including operating the motor at a first substantially constant torque level, varying the static pressure of the system, receiving a torque selection signal from external to the motor, and operating the motor at a second substantially constant torque level, the level corresponding to the torque selection signal.

18 Claims, 4 Drawing Sheets

U.S. PATENT DOCUMENTS

| | | | | |
|---|---|---|---|---|
| 5,559,407 | A * | 9/1996 | Dudley et al. | 318/439 |
| 5,592,058 | A * | 1/1997 | Archer et al. | 318/254 |
| 5,592,059 | A * | 1/1997 | Archer | 318/254 |
| 5,616,995 | A * | 4/1997 | Hollenbeck | 318/432 |
| 5,692,385 | A * | 12/1997 | Hollenbeck et al. | 62/154 |
| 5,709,533 | A * | 1/1998 | Dias | 417/18 |
| 5,736,823 | A * | 4/1998 | Nordby et al. | 318/432 |
| 6,143,257 | A | 11/2000 | Spriggs et al. | 422/264 |
| 6,332,102 | B1 * | 12/2001 | Nakajima et al. | 700/245 |
| 6,357,975 | B1 * | 3/2002 | Elrod et al. | 409/80 |
| 6,449,537 | B1 * | 9/2002 | Phillips et al. | 701/22 |
| 6,469,469 | B1 * | 10/2002 | Chambers et al. | 318/801 |
| 6,472,843 | B1 * | 10/2002 | Smith et al. | 318/727 |
| 6,504,338 | B1 * | 1/2003 | Eichorn | 318/727 |
| 6,525,496 | B1 * | 2/2003 | Bilcke | 318/432 |
| 6,530,426 | B1 * | 3/2003 | Kishita et al. | 165/202 |
| 6,707,267 | B1 * | 3/2004 | Bilcke | 318/432 |
| 6,718,651 | B1 * | 4/2004 | Perez et al. | 34/96 |
| 6,753,853 | B1 * | 6/2004 | Dotson | 345/173 |
| 6,768,440 | B1 * | 7/2004 | Troutman | 341/150 |
| 6,791,226 | B1 * | 9/2004 | Dhawan | 310/184 |
| 6,812,661 | B1 * | 11/2004 | Maslov et al. | 318/268 |
| 6,834,730 | B1 * | 12/2004 | Gass et al. | 173/2 |
| 6,836,087 | B1 * | 12/2004 | Gladkov | 318/268 |
| 6,850,807 | B1 * | 2/2005 | Tahira | 700/79 |
| 6,853,107 | B1 * | 2/2005 | Pyntikov et al. | 310/184 |
| 6,867,399 | B1 * | 3/2005 | Muegge et al. | 219/681 |
| 6,948,396 | B1 * | 9/2005 | Stevenson | 74/335 |
| 6,967,459 | B1 * | 11/2005 | Hahn et al. | 318/599 |
| 2001/0026135 | A1 * | 10/2001 | Zalkin et al. | 318/432 |
| 2002/0097015 | A1 * | 7/2002 | Kitajima et al. | 318/432 |
| 2002/0117989 | A1 * | 8/2002 | Kawabata et al. | 318/700 |
| 2002/0171383 | A1 * | 11/2002 | Hisada et al. | 318/432 |
| 2003/0042860 | A1 * | 3/2003 | Sulfstede | 318/432 |
| 2003/0128004 | A1 * | 7/2003 | Bilcke | 318/432 |
| 2005/0001571 | A1 * | 1/2005 | Benchaib et al. | 318/432 |
| 2005/0184689 | A1 * | 8/2005 | Maslov et al. | 318/254 |
| 2005/0212471 | A1 * | 9/2005 | Patel et al. | 318/432 |
| 2005/0269983 | A1 * | 12/2005 | Takai et al. | 318/432 |
| 2005/0272560 | A1 * | 12/2005 | Doering et al. | 477/186 |
| 2005/0280384 | A1 * | 12/2005 | Sulfstede | 318/432 |
| 2006/0091839 | A1 * | 5/2006 | Archer et al. | 318/432 |

OTHER PUBLICATIONS

"Switched Reluctance Motor," Freescale Semiconductors, 2004-2006, website http://www.freescale.com/webapp/sps/site/overview.jsp?nodeld=02nQXGrrlPb02R, pp. 1-2.*

* cited by examiner

METHOD AND APPARATUS FOR DISCRETE SPEED COMPENSATED TORQUE STEP MOTOR CONTROL

BACKGROUND OF THE INVENTION

This invention relates generally to electric motors, and more particularly, to methods and apparatus for controlling the operation of electric motors.

At least some known fluid handling systems utilize a constant flow rate through a contained space of a system that may include an apparatus for conditioning the temperature of the fluid. Within such systems the rate of fluid flow may be related to the static pressure associated with the system wherein the static pressure may vary due to changes in system flow demands. The apparatus may include an electric motor coupled to a fluid driver such as a fan, a blower, or a pump. The speed and torque of the electric motor may be affected by the static pressure of the system and the rate of fluid flow. The static pressure of the system and the rate of fluid flow may vary according to the changing system demands. Providing systems with motor speed and torque characteristics matched to a fluid mover to provide an approximately constant fluid flow to the system may require laborious and time consuming attempts to match motor speed and torque with the proper fluid mover to at least approximate the desired fluid flow rate for the particular contained space and static pressure of the particular apparatus or the system in which such apparatus was employed.

For example, if the fluid mover is a squirrel cage type blower, a decrease in the static pressure acting on the blower may result in a decrease in the speed of the blower and the electric motor driving it. Conversely, if the static pressure acting on the blower is increased, the speed of the fan and the electric motor may be correspondingly increased. Thus, the speed of squirrel cage type blowers and electric motors varies directly, i.e. in following relation, with a variation of the static pressure.

However, maintaining a substantially constant fluid flow operation with a varying system static pressure may require auxiliary detection and control components that may increase procurement and manufacturing costs beyond those that a customer may be willing to incur.

BRIEF DESCRIPTION OF THE INVENTION

In one embodiment, a method for controlling a motor is provided. The motor may be operated in a fluid system having a variable static pressure acting on the motor. The method includes operating the motor at a first substantially constant torque level, varying the static pressure of the system, receiving a torque selection signal from external to the motor, and operating the motor at a second substantially constant torque level, the level corresponding to the torque selection signal.

In another embodiment, a motor is provided. The motor includes a stationary assembly including a plurality of winding stages for carrying motor current, a rotatable assembly in magnetic driving relation with the stationary assembly, and a commutation electronics configured to supply a pulsed DC voltage in a preestablished sequence to the plurality of winding stages, the commutation electronics configured to receive a constant torque selection signal from a source external to the motor, the commutation electronics further configured to control motor current in the plurality of winding stages such that the motor generates one of a plurality of constant torque levels corresponding to the constant torque selection signal.

In yet another embodiment, a fluid system comprising a motor wherein the motor is configured to receive a constant torque selection signal from a source external to the motor, the commutation electronics further configured to control motor current in the plurality of winding stages such that the motor generates one of a plurality of constant torque levels corresponding to the constant torque selection signal, a fluid mover coupled to the motor, the fluid mover in fluid communication with a contained space within the fluid system, the fluid mover configured to generate a fluid flow through the fluid system in relation to a static pressure in the contained space and a rotational speed of the fluid mover, and at least one flow regulator configured to modify flow through the fluid system such that a static pressure acting on the fluid mover is variable based on a position of the fluid regulator.

DETAILED DESCRIPTION OF THE INVENTION

Figure 1:
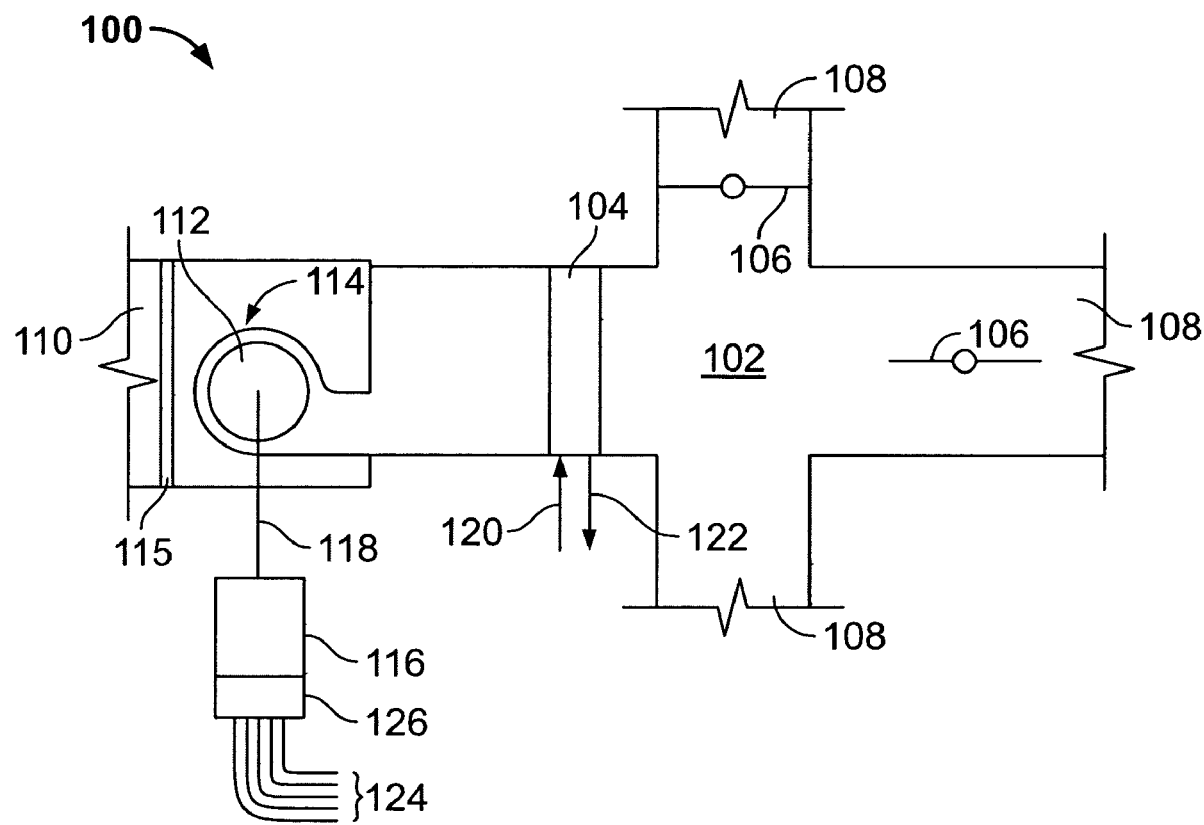
FIG. 1 is a schematic diagram of an exemplary fluid moving system such as a residential heating, ventilation and air conditioning (HVAC) system, a light industrial HVAC system, or a clean room filtering system.

FIG. 1 is a schematic diagram of an exemplary fluid moving system 100 such as a residential heating, ventilation and air conditioning (HVAC) system, a light industrial HVAC system, or a clean room filtering system. System 100 may include a characteristic static pressure that may be determined based on the dimensions and configuration of a contained space 102, a temperature conditioning apparatus 104, for example an evaporator coil of an air conditioner or a heat pump, or furnace heat exchanger, a position of a flow regulator, such as, damper 106, and a vent or register 108. System 100 may include a ductwork channel 110 for directing a flow of fluid, for example, air to an inlet 112 of a blower 114. Channel 110 may include a filter 115 that, over time, may be subject to clogging. A motor 116 may be coupled to blower 114 through a shaft 118 for rotationally driving blower 114. In the exemplary embodiment, motor 116 is an electronically commutated motor (ECM). In various embodiments, motor 116 is coupled to blower 114 through a power transmission device, such as, but not limited to a belt, a chain, and a fluid drive. Temperature conditioning apparatus 104, may be positioned within ductwork channel 110 for conditioning the fluid flowing through blower 114 and into contained space 102. Temperature conditioning apparatus 104 may be in fluid communication with a firebox of a furnace (not shown) or evaporator of a heat pump (not shown) through a heat exchanger inlet 120 and may discharge gases to a flue (not shown) or a heat pump return (not shown) through an outlet 122. Dampers 106 and/or registers 108 may selectively be positioned manually and/or automatically in relation to demand for conditioned fluid. The varying positions of dampers 106 and registers 108 or clogging of air filter 115 may cause the static pressure, into which blower 114 is directing a flow of fluid, to change. The change in static pressure may in turn cause a change in fluid flow and speed of rotation of blower 114 and motor 116.

In the exemplary embodiment, motor 116 is configured to generate a selectable level of substantially constant torque. As the static pressure in system 100 increases, a rotational speed of blower 114 and fluid flow through blower 114 decreases. The rotational speed of blower 114 may be detected continuously or intermittently to determine that the static pressure of system 100 and consequently the flow through blower 114 is decreased. The rotational speed may be compared to a predetermined rotational speed threshold for selecting a next level of substantially constant torque at which motor 116 may operate. Increasing the level of torque at which motor 116 is operating increases the rotational speed of blower 114 and the fluid flow generated by blower 114. In the exemplary embodiment, the level of substantially constant torque of motor 116 is selectable by selecting one of a plurality of selection lines 124 that are communicatively coupled to motor 116 through a commutation electronics 126. In an alternative embodiment, the level of substantially constant torque of motor 116 is selectable through a signal line (not shown) communicatively coupled to commutation electronics 126. The signal line may transmit a digital signal to a processor (not shown) programmed to change the level of substantially constant torque of motor 116.

Figure 2:
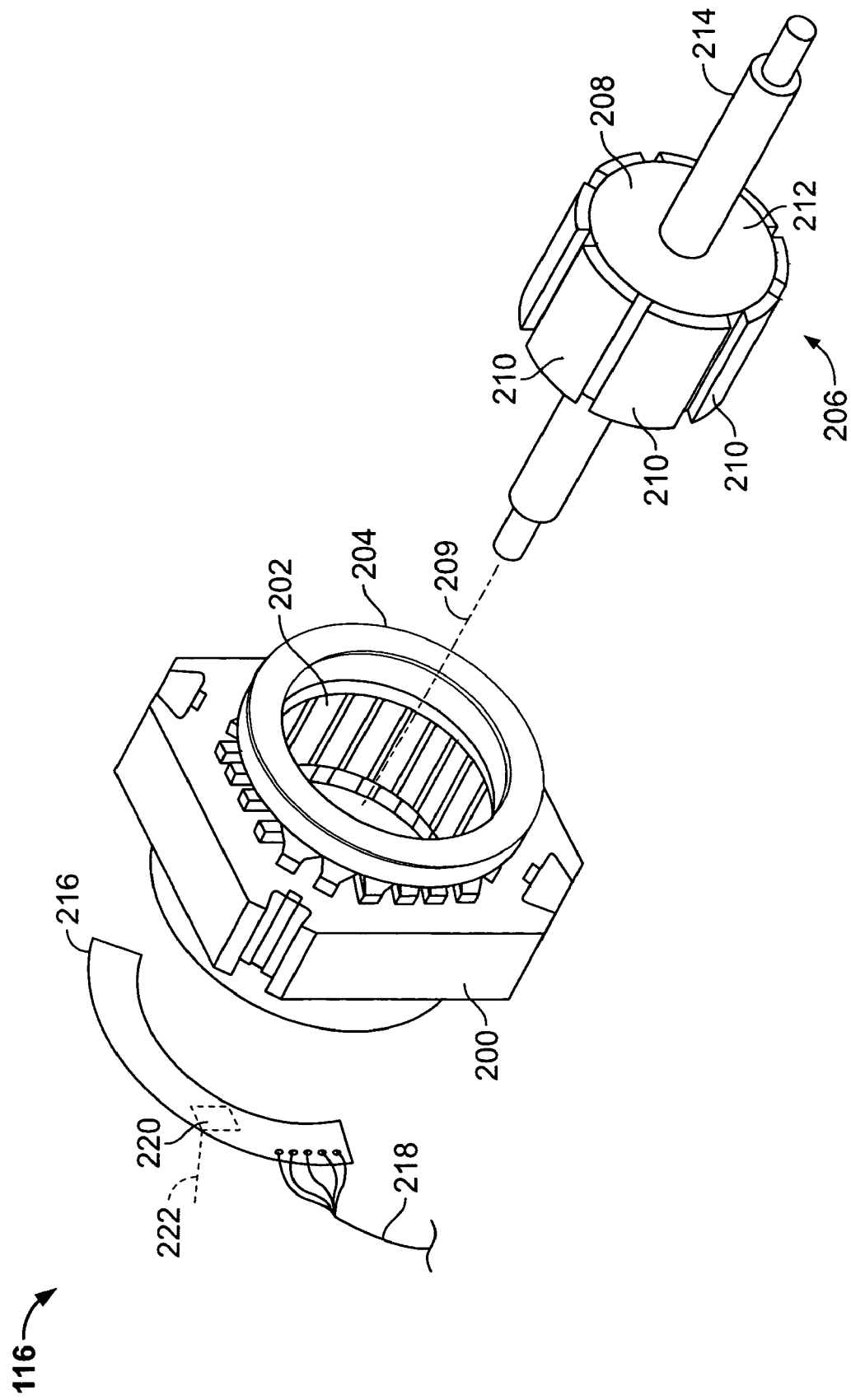
FIG. 2 is a perspective view of an exemplary selectable torque dynamoelectric machine that may be used in the system shown in FIG. 1.

FIG. 2 is a perspective view of an exemplary selectable torque motor 116, such as for example, an ECM. A stationary assembly 200 includes a core or stator 202 of a ferromagnetic material, and a winding arrangement 204. In the exemplary embodiment, the windings associated with winding arrangement 204 are configured to be electronically commutated in at least one preselected sequence. In an alternative embodiment, the windings associated with winding arrangement 204 are configured to be selectable separately or in combination to affect different discrete torque operating levels. A rotatable assembly 206 of motor 116 is rotatably associated with stationary assembly 200 and may include a permanent magnet rotor 208 operable generally for rotatably driving blower 114. Rotatable assembly 206 may be associated, in selective magnetic coupling relation, with permanent magnet rotor 208, so as to be rotatably driven about a longitudinal axis 209 by multistage winding arrangement 204 upon the electronic commutation thereof. Permanent magnet rotor 208 includes a plurality of magnet material elements 210 secured to a rotor 212 generally about the circumference thereof, and the rotor is secured about a shaft 214. Rotor shaft 214 may be journaled by one or more bearings (not shown) in a pair of opposite end frames (not shown) forming a part of stationary assembly 200, and rotor shaft 214 is configured to be coupled in rotatable driving relation with blower 114. Motor 116 may include a commutation electronics 216 configured to sense a rotational position of rotatable assembly 206 within stationary assembly 200 and to provide signals to the winding stage in a preselected order to magnetically drive rotatable assembly 206 about longitudinal axis 209. In the exemplary embodiment, commutation electronics 216 may include a plurality of input lines that may be used to transmit selection signals from a user's control device (not shown) to motor 116. In one embodiment, each of the input lines corresponds to a constant torque configuration of motor 116. In another embodiment, the input lines may be used in combination to transmit selection signals from a user's control device to motor 116. The selection signals may be used to select one of a plurality of constant torque configurations of motor 116. In an alternative embodiment, a processor 220 may be used to receive a selection signal or message from a user's control device through a cable 222. Processor 220 may be programmed to control motor 116 to provide one of a plurality of selectable constant torque output levels based on the selection signal or message.

In the exemplary embodiment, motor 116 is a permanent magnet electrical machine with magnet material elements 210 spaced substantially circumferentially along an out periphery of permanent magnet rotor 208 and multiple, spatially distributed winding arrangement 204 on stator 202. Current in the windings of winding arrangement 204 interacts with the permanent magnetic field to produce the motor's torque. To maintain a constant torque as the rotor turns, the current distribution in stator 202 is continually adjusted to maintain a constant spatial relationship with the magnetic field of rotor 208. The adjustment in current distribution is accomplished by switching ("commutating") current among the various stator winding phases. Commutation may be effected electronically by controlling the conduction states of a multiplicity of electronic power devices (not shown) electrically coupling the various stator phase windings to a power bus.

Figure 3:
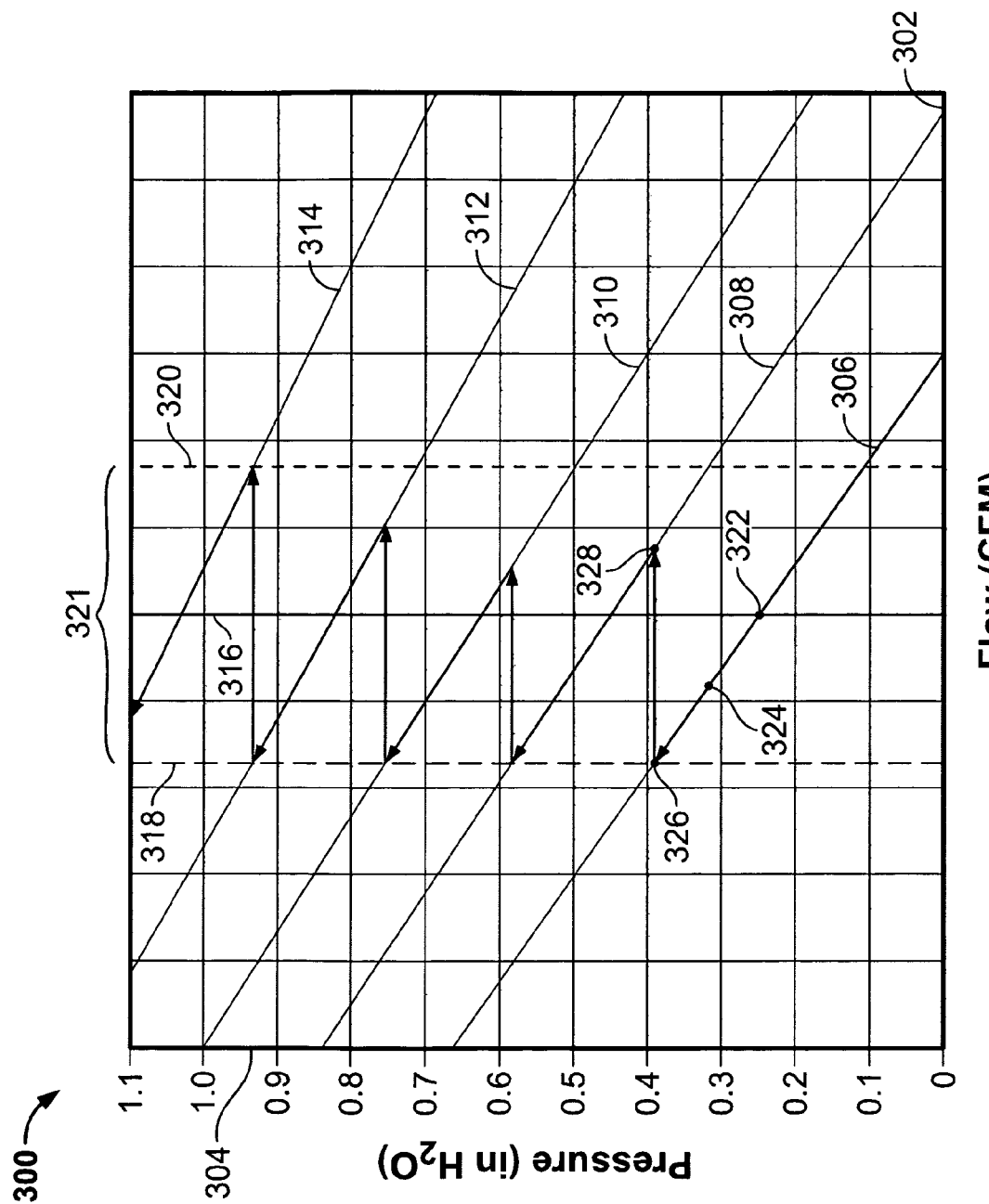
FIG. 3 is a graph illustrating an exemplary flow versus static pressure relationship for a system that may be used with the blower and motor shown in FIG. 1.

FIG. 3 is a graph 300 illustrating an exemplary flow versus static pressure relationship for a system that may be used with blower 114 and motor 116 (shown in FIG. 1). Graph 300 includes an x-axis 302 graduated in divisions of fluid flow expressed in cubic feet per minute (CFM) and a y-axis 304 graduated in divisions of system static pressure expressed in units of inches of water (in $H_2O$). A plurality of constant torque lines define the operating characteristics for the combination of blower 114, motor 116, and system 100. A first constant torque line 306 defines an fluid flow response of blower 114 for a system static pressure that is defined by the positions of dampers 106 and registers 108 when a first torque operating level for motor 116 is selected. Similarly, a second constant torque line 308, a third constant torque line 310, a fourth constant torque line 312, and a fifth constant torque line 314 respectively define an fluid flow response of blower 114 for an associated system static pressure when respective torque operating levels are selected. A line 316 illustrates a desired constant fluid flow through system 100, a line 318 illustrates a lower limit of fluid flow, and a line 320 illustrates an upper limit of fluid flow for system 100. Together, lines 318 and 320 define a band 321 of desired fluid flows through system 100 that is generally equally spaced about line 316, although band 321 may be selected to be spaced about line 316 in non-equally.

In operation, system 100 may initially be operating at a point 322, for example, wherein motor 116 is selected to be outputting a first level of torque and blower 114 is outputting the desired fluid flow as indicated by operating point 322 being at the intersection of constant torque line 306 and fluid flow line 316. If a change in system 100 causes an increase in system static pressure, such as a repositioning of dampers 106 and/or registers 108, the system operating parameters will change such that system 100 will operate at a new operating point 324 along line 306. Because motor 116 is configured to maintain the selected torque output substantially constant, when system static pressure increases the system operating point changes such that the fluid flow will decrease to a value corresponding to the intersection of line 306 and the value of static pressure the system is operating at. In this example, changes to system 100 caused system static pressure to increase from approximately 0.25 in H$_2$O to approximately 0.31 in H$_2$O. The system operating point moves along line 316 to operating point 324 wherein the fluid flow through system 100 and the speed of rotation of motor 116 decreases correspondingly. A further change in the position of dampers 106 and/or registers 108, or other device that may affect system static pressure may cause the system parameters to change such that the system will operate at another new operating point 326 along line 306. If at this point the speed of motor 116 reaches a value that corresponds to an fluid flow defined by lower limit 318, a speed sensor or a sensor configured to sense a parameter that may correspond to the rotational speed of motor 116, may transmit a signal that causes motor 116 to operate at a second torque level defined by second constant torque line 308. Motor 116 will accelerate rotationally to operating point 328 such that motor 116 speed and fluid flow through blower 114 increases to a value corresponding to the intersection of the value of static pressure and constant torque line 308.

System 100 operates similarly for further increases in system static pressure by stepping to a next higher selectable constant torque level when the speed of motor 116 and correspondingly, the fluid flow through blower 114 decreases to lower a value defined by lower fluid flow limit 318.

Figure 4:
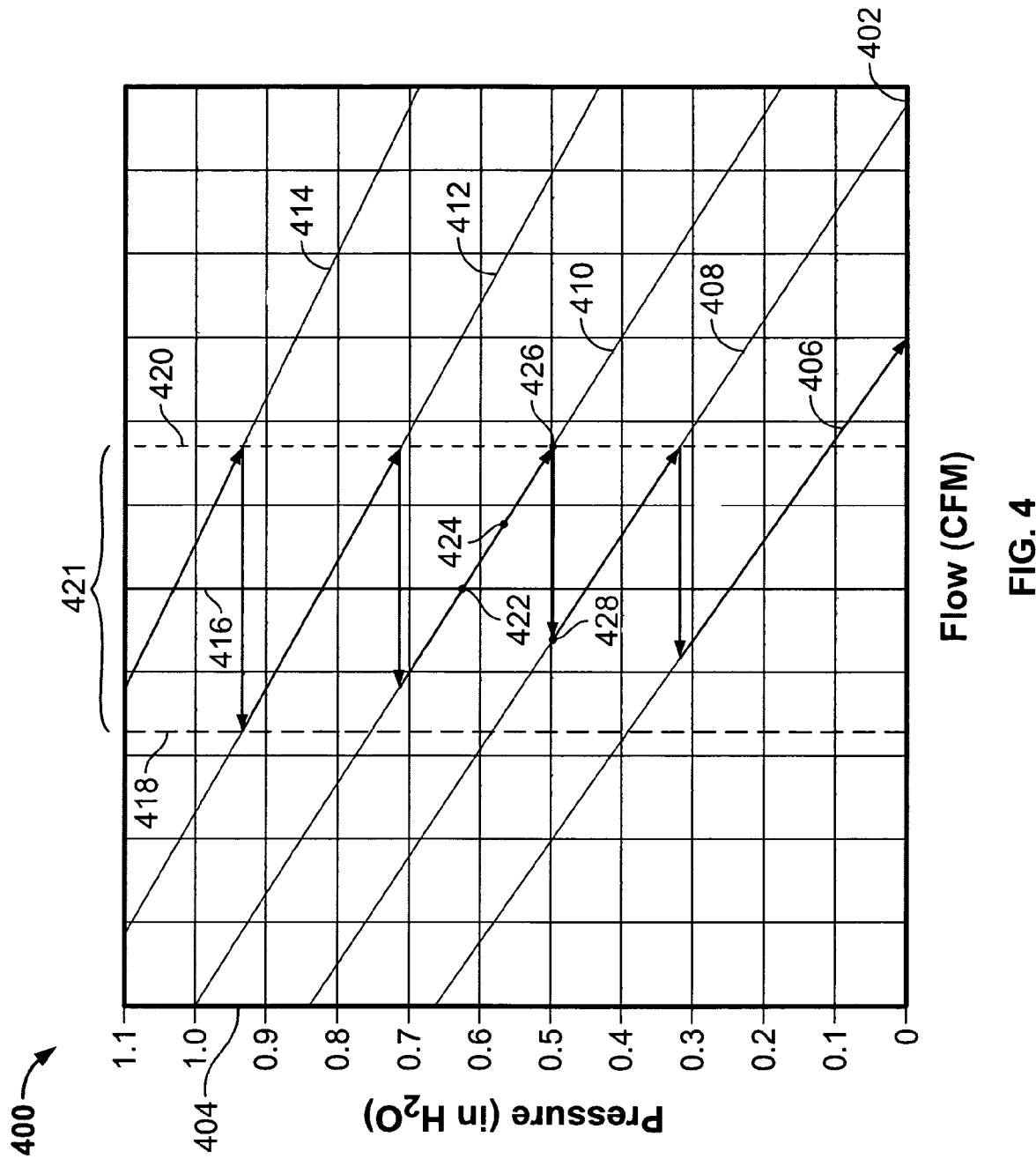
FIG. 4 is a graph illustrating another exemplary flow versus static pressure relationship for a system that may be used with the blower and motor shown in FIG. 1.

FIG. 4 is a graph 400 illustrating another exemplary flow versus static pressure relationship for a system that may be used with blower 114 and motor 116 (shown in FIG. 1). Graph 400 includes an x-axis 402 graduated in divisions of fluid flow expressed in cubic feet per minute (CFM) and a y-axis 404 graduated in divisions of system static pressure expressed in units of inches of water (in H$_2$O). A plurality of constant torque lines define the operating characteristics for the combination of blower 114, motor 116, and system 100. A first constant torque line 406 defines an fluid flow response of blower 114 for a system static pressure that is defined by the positions of dampers 106 and registers 108 when a first torque operating level for motor 116 is selected. Similarly, a second constant torque line 408, a third constant torque line 410, a fourth constant torque line 412, and a fifth constant torque line 414 respectively define an fluid flow response of blower 114 for an associated system static pressure when respective torque operating levels are selected. A line 416 illustrates a desired constant fluid flow through system 100, a line 418 illustrates a lower limit of fluid flow, and a line 420 illustrates an upper limit of fluid flow for system 100. Together, lines 418 and 420 define a band 421 of desired fluid flows through system 100 that is generally equally spaced about line 416, although band 421 may be selected to be spaced about line 416 in non-equally.

In operation, system 100 may initially be operating at a point 422, for example, wherein motor 116 is selected to be outputting a third level of torque and blower 114 is outputting the desired fluid flow as indicated by operating point 422 being at the intersection of constant torque line 410 and fluid flow line 416. If a change in system 100 causes an decrease in system static pressure, such as a repositioning of dampers 106 and/or registers 108, the system operating parameters will change such that system 100 will operate at a new operating point 424 along line 410. Because motor 116 is configured to maintain the selected torque output substantially constant, when system static pressure decreases, the system operating point changes such that the fluid flow will increase to a value corresponding to the intersection of line 410 and the value of static pressure the system is operating at. In this example, changes to system 100 caused system static pressure to decrease from approximately 0.62 in H$_2$O to approximately 0.57 in H$_2$O. The system operating point moves along line 410 to operating point 424 wherein the fluid flow through system 100 and the speed of rotation of motor 116 increases correspondingly. A further change in the position of dampers 106 and/or registers 108, or other device that may affect system static pressure may cause the system parameters to change such that the system will operate at another new operating point 426 along line 410. If at this point the speed of motor 116 reaches a value that corresponds to a fluid flow defined by upper limit 420, a speed sensor or a sensor configured to sense a parameter that may correspond to the rotational speed of motor 116, may transmit a signal that causes motor 116 to operate at a different torque level defined by second constant torque line 408. Motor 116 will decelerate rotationally to operating point 428 such that motor 116 speed and fluid flow through blower 114 decreases to a value corresponding to the intersection of the value of static pressure and constant torque line 408.

System 100 operates similarly for further decreases in system static pressure by stepping to a next lower selectable constant torque level when the speed of motor 116 and correspondingly, the fluid flow through blower 114 increases to an upper value defined by upper fluid flow limit 420.

The above-described embodiments of methods and apparatus for discrete speed compensated torque step motor control are cost-effective and highly reliable for maintaining a relatively constant flow through a fluid system using relatively less expensive control components such that a selectable substantially constant torque is generated by the motor in response to an input signal indicative generally of motor speed.

While the invention has been described in terms of various specific embodiments, those skilled in the art will recognize that the invention can be practiced with modification within the spirit and scope of the claims.

What is claimed is:

1. A method for controlling a motor comprising a commutation electronics configured to supply a pulsed DC voltage in a pre-established sequence to said plurality of winding stages, using discrete torque settings, in a fluid system having a variable static pressure acting on the motor, said method comprising:

operating the motor at a first substantially constant torque level;

receiving a torque selection signal from a source external to the motor at the said commutation electronics, said motor including at least one of: a separate input for each of a plurality of constant torque selection signals, each separate input corresponding to one of the plurality of constant torque levels; a plurality of separate inputs corresponding to a plurality of constant torque selection signals, each of the plurality of constant torque selection signals corresponding to one of the plurality of constant torque levels; and a plurality of separate inputs corresponding to a plurality of constant torque selection signals, a predetermined combination of said separate inputs corresponding to one of the plurality of constant torque levels; and operating the motor at a second substantially constant torque level, the level corresponding to the torque selection signal.

2. The method in accordance with claim 1 further comprising electronically commutating the motor.

3. The method in accordance with claim 1 further comprising determining the second substantially constant torque level using the first substantially constant torque level and a determined rotational speed of the motor.

4. The method in accordance with claim 1 further comprising comparing a determined speed of the motor to a predetermined threshold speed.

5. The method in accordance with claim 4 further comprising switching the motor from operating at the first substantially constant torque level to the second substantially constant torque level using the comparison of the determined speed of the motor and the predetermined threshold speed.

6. The method in accordance with claim 4 further comprising switching the motor from operating at the first substantially constant torque level to operating at one of a plurality of substantially constant torque levels using the comparison of the determined speed of the motor and the predetermined threshold speed.

7. The method in accordance with claim 1 wherein receiving a torque selection signal from external to the motor comprises determining a rotational speed of the motor using the commutation electronics.

8. The method in accordance with claim 1 wherein the fluid system includes a blower coupled to the motor through a shaft, and wherein receiving a torque selection signal from external to the motor comprises determining a rotational speed of the shaft.

9. The method in accordance with claim 1 wherein receiving a torque selection signal from external to the motor comprises determining a rotational speed of the motor using a fluid system process parameter that is proportional to the rotational speed of the motor.

10. A motor apparatus comprising:
  a stationary assembly including a plurality of winding stages for carrying motor current;
  a rotatable assembly in magnetic driving relation with said stationary assembly; and
  said motor apparatus comprising a commutation electronics configured to supply a pulsed DC voltage in a pre-established sequence to said plurality of winding stages, said commutation electronics comprising at least one of a separate input for each of a plurality of constant torque selection signals, each separate input corresponding to one of the plurality of constant torque levels, a plurality of separate inputs corresponding to a plurality of constant torque selection signals, each of the plurality of constant torque selection signals corresponding to one of the plurality of constant torque levels, and a plurality of separate inputs corresponding to a plurality of constant torque selection signals, a predetermined combination of said separate inputs corresponding to one of the plurality of constant torque levels, said motor apparatus configured to receive a constant torque selection signal from a source external to said motor apparatus, said motor apparatus further configured to control motor current in said plurality of winding stages such that said motor apparatus generates one of a plurality of constant torque levels corresponding to the constant torque selection signal.

11. A motor apparatus in accordance with claim 10 wherein said commutation electronics is configured to receive an analog constant torque selection signal.

12. A motor apparatus in accordance with claim 10 wherein said commutation electronics is configured to receive a digitally encoded constant torque selection signal.

13. A motor apparatus in accordance with claim 10 wherein said motor apparatus further comprises:
  a shaft coupled to said rotatable assembly; and
  a blower coupled to said shaft, said blower in fluid communication with a fluid system, and wherein said constant torque selection signal is switched based on a speed of rotation of said blower.

14. A motor apparatus in accordance with claim 13 wherein said blower is coupled to said shaft through a power transmission device.

15. A fluid system comprising:
  an electronically commutated motor (ECM) comprising a commutation electronics configured to supply a pulsed DC voltage in a pre-established sequence to a plurality of winding stages, said motor comprising a plurality of winding stages, said commutation electronics comprising at least one of a separate input for each of a plurality of constant torque selection signals, each separate input corresponding to one of the plurality of constant torque levels, a plurality of separate inputs for a plurality of constant torque selection signals, each of the plurality of constant torque selection signals corresponding to one of the plurality of constant torque levels, and a plurality of separate inputs corresponding to a plurality of constant torque selection signals, a predetermined combination of said separate inputs corresponding to one of the plurality of constant torque levels, said motor configured to receive a constant torque selection signal from a source external to said motor, said motor further configured to control motor current in said plurality of winding stages such that said motor generates one of a plurality of constant torque levels corresponding to the constant torque selection signal;
  a fluid mover coupled to said motor, said fluid mover in fluid communication with a contained space within said fluid system, said fluid mover configured to generate a fluid flow through said fluid system in relation to a static pressure in said contained space and a rotational speed of said fluid mover; and
  at least one flow regulator configured to modify flow through the fluid system such that a static pressure acting on said fluid mover is variable based on a position of said fluid regulator.

16. A fluid system in accordance with claim 15 wherein said commutation electronics is configured to receive an analog constant torque selection signal.

17. A fluid system in accordance with claim 15 wherein said commutation electronics is configured to receive a digitally encoded constant torque selection signal.

18. A fluid system in accordance with claim 17 wherein said motor comprises a shaft coupled to a blower, said blower in fluid communication with a fluid system, and wherein said constant torque selection signal is switched based on a speed of rotation of said blower.

* * * * *